UNITED STATES PATENT OFFICE.

BENJAMIN B. THOMAS, OF ROSSVILLE, TENNESSEE.

WELDING.

SPECIFICATION forming part of Letters Patent No. 680,182, dated August 6, 1901.

Application filed February 27, 1901. Serial No. 49,157. (No specimens.)

*To all whom it may concern:*

Be it known that I, BENJAMIN B. THOMAS, a citizen of the United States, residing at Rossville, in the county of Fayette and State of Tennessee, have invented a new and useful Method of Welding, of which the following is a specification.

This invention relates to the art of welding metals, and has for its object to provide a new and improved method of welding different metals as well as metals of the same kind and also to produce a more firmly knit and homogeneous joint than heretofore secured in the common or ordinary method of welding. It is furthermore designed to promote the fusion of the metals and the softening thereof, so as to more thoroughly run the same together and also to promote the hardening of the welded portions and to prevent disintegration thereof after the joint has become cold.

In a general sense the present method is carried out in the following manner: The parts to be welded are first cleaned by removing all foreign matter therefrom, after which they are raised to a red heat. Then the heated portions are subjected to the chemical action of a welding compound, which comprises certain ingredients or elements that are designed to promote fusion and softening of the metals, so as to effectually run the same together and also to promote hardening and to prevent disintegration of the joint after it has become cold, then reheating the treated metals to a white heat, and finally subjecting the same to a continuous pressure, as distinguished from hammering, so as to effectually unite and knit the parts in a solid homogeneous mass or joint. The first or cleaning step is carried out by the application of acid, preferably nitric acid, to remove all foreign matter from the surface of the metals and also to unite chemically therewith to render the metals more susceptible to the action of the welding compound to be afterward applied. The second step consists in subjecting the metal parts to the action of heat until they have been raised to a red state. The third step consists in dipping the heated portions of the metals into the welding compound, which is in the form of a powder, the powder being taken up by the metal parts and melted or fused into the same by the heat thereof. The welding compound consists of the following ingredients or elements: carbonate of iron, two ounces; steel-dust or cast-iron filings, 1.5 ounces; pulverized glass, five ounces; pulverized borax, one ounce; prussiate of potash, one ounce; muriate of ammonia, one ounce, and pulverized rosin, .5 ounce. These ingredients are thoroughly mixed or intermingled, so as to form a relatively homogeneous powder, in which form the compound is put up for market. The fourth step consists in reheating the metals to a white or welding heat, and the fifth step consists in placing the heated and treated portions of the metals in contact and then submitting the same to a continuous pressure, as distinguished from an intermittent pressure produced by hammering in the common or ordinary manner. After the application of the welding-powder and during the reheating of the metals the powder melts and unites with the metals, so as to thoroughly permeate the same. The action of the rosin is to promote fusion of the metals during the reheating of the same, while the borax prevents burning thereof. The carbonate of iron and the steel-dust unite with the metals by entering the pores thereof to soften the same and also promote adhesion and hardening of the metals after they have become cold or, to be more correct, during the cooling thereof, and the pulverized glass, together with the potash and ammonia, cause increased adhesion in the united mass of metal, and thereby prevent disintegration thereof after the joint has become cold. During the reheating of the metals they become exceedingly soft, due to the presence of the welding compound, and instead of hammering the parts to be united they are subjected to a continuous pressure, whereby the parts merge into one another and become firmly knit in a more homogeneous mass than heretofore by the common or ordinary method.

What is claimed is—

1. The herein-described method of welding metals, consisting in cleansing the latter, raising the same to a red heat, subjecting the heated portions to a welding-powder, which has the properties of promoting fusion, causing softening during the heating of the metals, and also hardening during the cooling thereof, and consisting of carbonate of iron, steel-dust, or cast-iron filings, pulverized glass, pulverized borax, prussiate of potash, muriate of ammonia and pulverized rosin, then reheating the treated metals to a white heat, and finally submitting the metals to a continuous pressure.

2. A step in the process of welding, consisting in subjecting the heated metals to the action of a welding compound having the properties of promoting fusion, producing softening, and also promoting hardening and preventing disintegration of the metals during and after the cooling thereof, and composed of carbonate of iron, steel-dust, or cast-iron filings, pulverized glass, pulverized borax, prussiate of potash, muriate of ammonia and pulverized rosin.

In testimony that I claim the foregoing as my own I have hereunto affixed my signature in the presence of two witnesses.

BENJAMIN B. THOMAS.

Witnesses:
A. V. WAN,
J. B. BALLARD.